US012761136B2

(12) United States Patent
Zamanzadeh et al.

(10) Patent No.: US 12,761,136 B2
(45) Date of Patent: Oct. 13, 2026

(54) ATMOSPHERIC CORROSIVITY MONITORING SYSTEM

(71) Applicant: AGRIGENICS INC., Presto, PA (US)

(72) Inventors: Mehrooz Zamanzadeh, Pittsburgh, PA (US); Anil Kumar Chikkam, Pittsburgh, PA (US); Farzan Zolfaghari, Pittsburgh, PA (US); Nathan Pace, Pittsburgh, PA (US); Carolyn Tome, Pittsburgh, PA (US)

(73) Assignee: AGRIGENICS, INC., Presto, PA (US)

( * ) Notice: Subject to any disclaimer, the term of this patent is extended or adjusted under 35 U.S.C. 154(b) by 169 days.

(21) Appl. No.: 18/773,917

(22) Filed: Jul. 16, 2024

(65) Prior Publication Data

US 2025/0027873 A1 Jan. 23, 2025

Related U.S. Application Data

(60) Provisional application No. 63/527,834, filed on Jul. 20, 2023.

(51) Int. Cl.
*G01N 17/04* (2006.01)

(52) U.S. Cl.
CPC .................................... *G01N 17/04* (2013.01)

(58) Field of Classification Search
None
See application file for complete search history.

(56) References Cited

U.S. PATENT DOCUMENTS

| | | | | |
|---|---|---|---|---|
| 6,243,483 | B1 | 6/2001 | Petrou et al. | |
| 6,680,619 | B1 * | 1/2004 | Horn | G01N 27/20 324/700 |
| 8,412,419 | B1 | 4/2013 | Seamon et al. | |
| 9,928,319 | B1 | 3/2018 | Dow et al. | |

(Continued)

FOREIGN PATENT DOCUMENTS

| | | |
|---|---|---|
| CN | 102903132 | 1/2013 |
| CN | 106483060 | 3/2017 |

(Continued)

OTHER PUBLICATIONS

ISO 9223, Second Edition, Feb. 1, 2012.

(Continued)

*Primary Examiner* — Jas A Sanghera
(74) *Attorney, Agent, or Firm* — Thomas Joseph; OGC Law, LLC

(57) ABSTRACT

A pair of spaced apart probes abut a metal component. A housing has a voltage measuring device coupled to the probes to measure the potential difference therebetween and a transmitter for transmitting potential difference measurements from the voltage measuring device over a network. A computing device connects to the network having an interface, a processor, and memory programmed with executable instructions. The potential difference measurements are received through the network. Output is generated for displaying the potential difference measurements with warnings on the interface when the potential difference measurements exceed or fall below predetermined threshold correlated to at least one of a corrosion phenomenon, a corrosion form, and a critical corrosion property.

20 Claims, 9 Drawing Sheets

(56) References Cited

U.S. PATENT DOCUMENTS

| | | | | |
|---|---|---|---|---|
| 10,107,770 | B2 | 10/2018 | Weindorf et al. | |
| 2010/0156632 | A1* | 6/2010 | Hyland | G01N 21/94 702/188 |
| 2011/0251721 | A1* | 10/2011 | Hefner | G01N 17/02 324/700 |
| 2012/0279599 | A1 | 11/2012 | Gluskin et al. | |
| 2015/0185133 | A1 | 7/2015 | Murray | |
| 2015/0268152 | A1 | 9/2015 | Friedersdorf | |
| 2016/0370333 | A1 | 12/2016 | Li | |
| 2017/0030850 | A1 | 2/2017 | Castaneda-Lopez et al. | |
| 2017/0316846 | A1 | 11/2017 | Efraimsson et al. | |
| 2017/0350807 | A1 | 12/2017 | Minamitani | |
| 2017/0359017 | A1* | 12/2017 | Corio | F16M 11/18 |
| 2018/0238820 | A1 | 8/2018 | Ghods et al. | |
| 2019/0224511 | A1* | 7/2019 | Cogswell | A62C 35/68 |
| 2020/0128720 | A1 | 4/2020 | Cizek | |
| 2022/0243749 | A1* | 8/2022 | Lim | C22C 38/50 |

FOREIGN PATENT DOCUMENTS

| | | |
|---|---|---|
| CN | 107403265 | 11/2017 |
| CN | 108020501 | 5/2018 |

OTHER PUBLICATIONS

Masetti, University of New Hampshire Scholars' Repository, (pp. 79-178) (Year: 2012).

Masetti, University of New Hampshire Scholars' Repository, first 100 pp. 1-78 (Year: 2012).

Masetti, University of New Hampshire Scholars' Repository, (pp. 179-264) (Year: 2012).

ArcGIS Desktop, "What is Geodata?" (Year: 2016).

* cited by examiner

ATMOSPHERIC CORROSIVITY MONITORING SYSTEM

CROSS REFERENCE TO RELATED APPLICATION

This application claims the benefit under 35 U.S.C. § 119 (e) of U.S. Provisional Application No. 63/527,834 entitled "ATMOSPHERIC CORROSIVITY MONITORING SYSTEM" filed Jul. 20, 2023, which is incorporated herein by reference.

BACKGROUND

Condensation of moisture in the atmosphere surrounding a metal deposits a thin layer of liquid water on the metal surface. Salts and other components dissolved in the water interact with the metal, resulting in progressive corrosion. Because atmospheric corrosion is cumulative, periodic inspection to monitor the mechanisms of atmospheric corrosion are necessary to mitigate metal deterioration.

Atmospheric corrosion can affect components of solar energy collection systems, roofing, piping, and other objects that are placed outdoors. Economic losses caused by atmospheric corrosion are enormous and results in the disappearance of a significant portion of metal produced. Atmospheric corrosion has been reported to account for more failures in terms of cost and tonnage than any other type of material degradation processes.

Certain atmospheres can be particularly corrosive environments. A large portion of the damage caused by corrosion is attributed to atmospheric corrosion. Protective coatings and, in particular, metals are subject to deterioration when exposed to atmospheric environments. Other materials can be adversely affected by such corrosive environments, as well.

Conventional physical detection methods of atmospheric corrosion, like determining the weight loss of metal, can take time as the atmospheric corrosion rate is slow. Further, conventional methods suffer drawbacks and limitations related to deposition of corrosion products and changes in a corrosion medium's conductivity that may affect the measurements. Furthermore, the application of traditional electrochemical methods to the study of metal corrosion will affect the true corrosion reaction of the tested samples due to the need for additional interference and they are not capable of accurately identifying localized corrosion or clearly evaluating cumulative corrosion processes because they can only receive the average electrochemical information of certain region in certain time. Accordingly, there is a need for improved tools for measuring and for monitoring atmospheric corrosivity and corrosion.

SUMMARY

The following summary is provided to introduce a selection of concepts in a simplified form that are further described below in the detailed description. This summary is not intended to identify key features or essential features of the claimed subject matter, nor is it intended to be used to limit the scope of the claimed subject matter.

In various implementations, a system for monitoring corrosion of a metal component is provided. A pair of spaced apart probes abut the metal component. A housing has a voltage measuring device coupled to the probes to measure the potential difference therebetween and a transmitter for transmitting potential difference measurements from the voltage measuring device over a network. A computing device connects to the network having an interface, a processor, and memory programmed with executable instructions. The potential difference measurements are received through the network. Output is generated for displaying the potential difference measurements with warnings on the interface when the potential difference measurements exceed or fall below a predetermined threshold correlated to at least one of a corrosion phenomenon, a corrosion form, and a critical corrosion parameter.

These and other features and advantages will be apparent from a reading of the following detailed description and a review of the appended drawings. It is to be understood that the foregoing summary, the following detailed description and the appended drawings are explanatory only and are not restrictive of various aspects as claimed.

DETAILED DESCRIPTION

Figure 1:
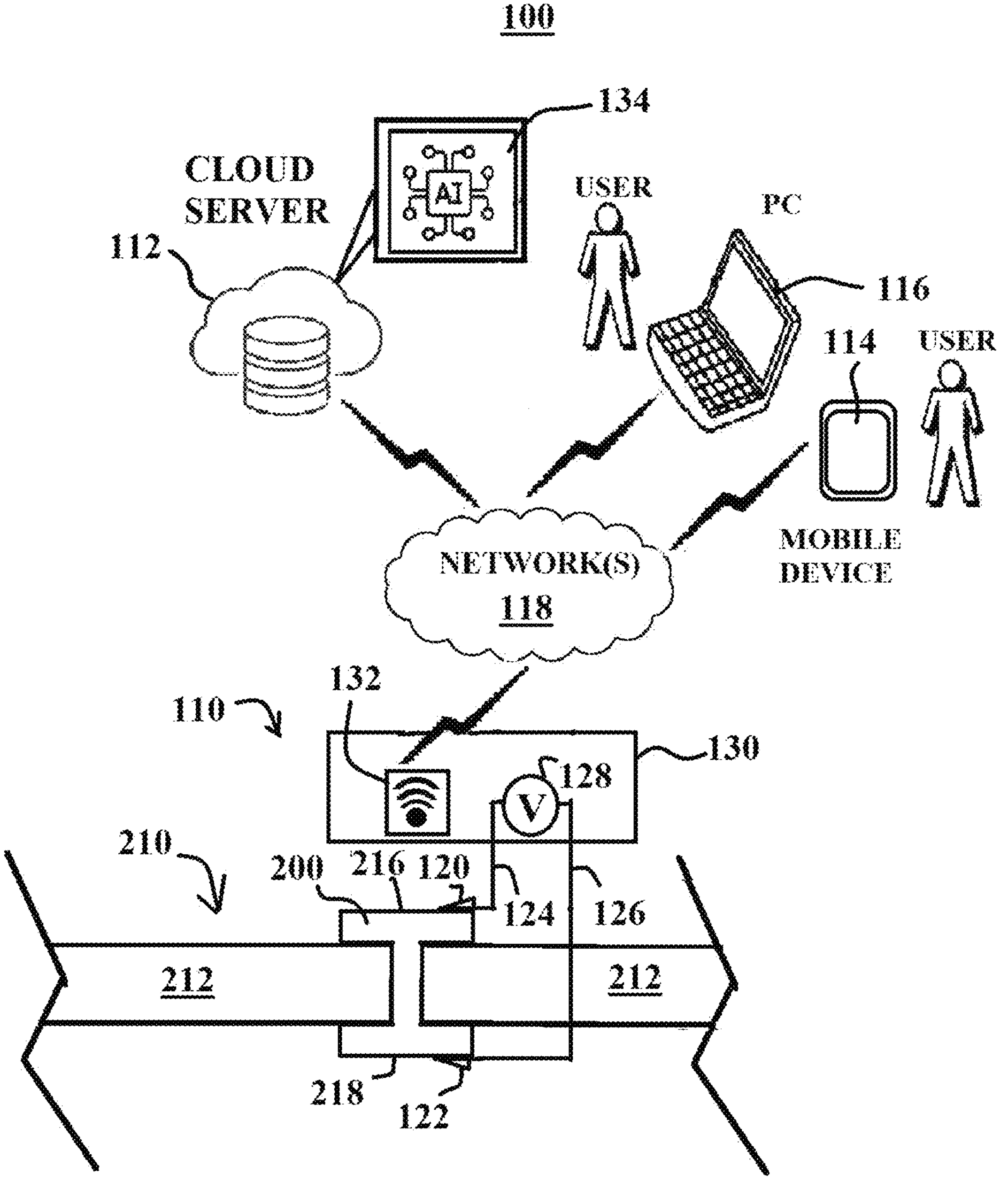
FIG. 1 is a schematic diagram of an operating environment in accordance with the subject disclosure.

The subject disclosure is directed to methods and systems for monitoring corrosion, and, more specifically, to methods and systems for directly measuring and monitoring corrosion phenomena, forms, and properties of outdoor structures. The methods and system utilize direct measurements that are transmitted over networks for viewing on apps on mobile devices. The methods and systems are particularly adapted for the direct measurement of atmospheric corrosivity The detailed description provided below in connection with the appended drawings is intended as a description of examples and is not intended to represent the only forms in which the present examples can be constructed or utilized. The description sets forth functions of the examples and sequences of steps for constructing and operating the examples. However, the same or equivalent functions and sequences can be accomplished by different examples.

References to "one embodiment," "an embodiment," "an example embodiment," "one implementation," "an implementation," "one example," "an example" and the like, indicate that the described embodiment, implementation or example can include a particular feature, structure or characteristic, but every embodiment, implementation or example can not necessarily include the particular feature, structure or characteristic. Moreover, such phrases are not necessarily referring to the same embodiment, implementation or example. Further, when a particular feature, structure or characteristic is described in connection with an embodiment, implementation or example, it is to be appreciated that such feature, structure or characteristic can be implemented in connection with other embodiments, implementations or examples whether or not explicitly described.

Numerous specific details are set forth in order to provide a thorough understanding of one or more embodiments of the described subject matter. It is to be appreciated, however, that such embodiments can be practiced without these specific details.

Various features of the subject disclosure are now described in more detail with reference to the drawings, wherein like numerals generally refer to like or corresponding elements throughout. The drawings and detailed description are not intended to limit the claimed subject matter to the particular form described. Rather, the intention is to cover all modifications, equivalents and alternatives falling within the spirit and scope of the claimed subject matter.

The subject disclosure is directed to systems and methods for monitoring corrosion in outdoor structures, such as components of solar energy collection systems, roofing, and piping. The systems and methods utilize probes that attach to metallic components of the structures. The probes are coupled to voltmeters that can measure the potential difference in real-time. The potential difference measurements are sent to computer systems over a network for storing and for viewing.

The potential difference measurements are correlated to corrosion phenomena, forms, and/or properties. The correlations can be developed using offline experimentation or via artificial intelligence/pattern recognition. Through the use of the systems and methods, corrosion properties, such as atmospheric corrosivity, can be measured in real-time.

Figure 2:
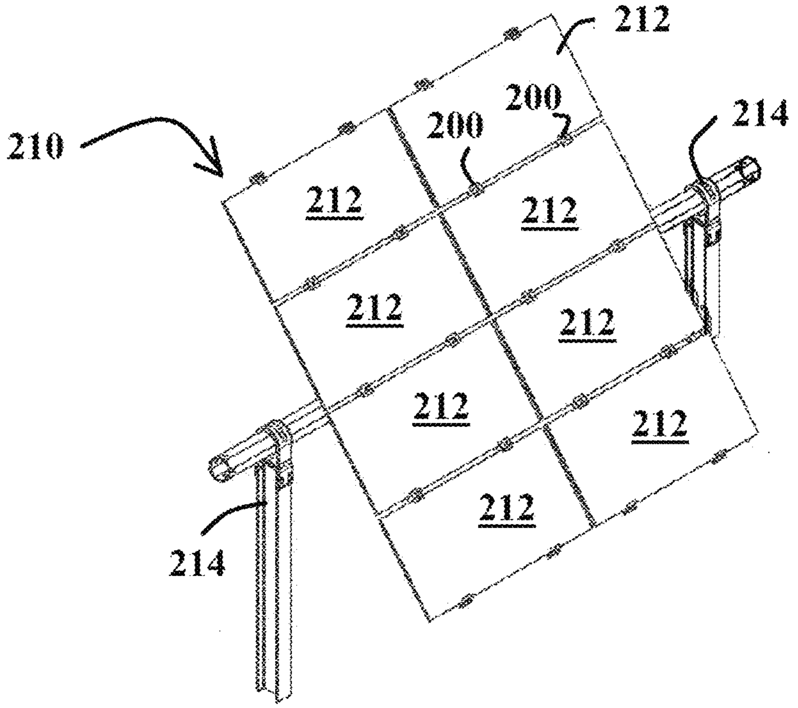
FIG. 2 is a perspective view of a solar energy collection system in accordance with the subject disclosure.

Referring to the drawings and, in particular, to FIGS. 1-2, a corrosion monitoring system, generally designated by the numeral 100, is shown. The system 100 includes a measuring assembly 110, a cloud server 112, a mobile device 114, and a personal computer 116 connected to one another through a network 118. The measuring assembly 110 is adapted to obtain potential difference measurements from a metallic component 200 of an outdoor structure 210.

The outdoor structure 210 is a solar energy collection system that includes a plurality of solar panels 212 mounted on a frame 214. The solar panels 212 are connected to one another with the metallic component 200, which can be fastener. In this exemplary embodiment, the metallic component 200 is a cinch. It should be understood that the outdoor structure 210 can be any structure that includes one or more metallic components, such as a roofing assembly or piping assembly.

As shown in FIG. 1, the measuring assembly 110 includes a pair of spaced apart probes 120-122 that abut a pair of surfaces 216-218 on the metallic component 200. The probes 120-122 are in physical contact with the metallic component 200, so that the probes 120-122 can be used to measure the electrical properties of the metallic component 200. In some embodiments, the probes 120-122 can be clamps or clips that the grab or otherwise engage the metallic component 200.

The probes 120-122 can be connected to a pair of wires 124-126 extending therefrom. The wires 124-126 can connect to a voltage measuring device 128 mounted within a housing 130 with a wireless transmitter 132. The voltage measuring device 128 is coupled to the probes 120-122 to measure the potential difference therebetween. The voltage measuring device 128 can be a voltmeter, a multimeter, or any other device that is capable of measuring the potential difference between the probes 120-122.

The wireless transmitter 132 is connected to the voltage measuring device 128. The wireless transmitter 132 obtains potential difference measurements from the voltage measuring device 128 and sends those measurements to the cloud server 112. In some exemplary embodiments, the potential difference measurements are sent periodically, such as every two hours.

The cloud server 112 receives the potential difference measurements through the network 118. The cloud server 112 can identify potential difference measurements that exceed or fall below a predetermined threshold. These potential difference measurements are correlated to certain corrosion phenomena, corrosion forms, and/or critical corrosion properties.

The corrosion phenomena can include corrosion initiation, corrosion propagation, or other corrosion phenomena. The corrosion form can include surface corrosion, corrosion beneath a surface, structural corrosion, and other corrosion forms. The critical corrosion properties can include atmospheric corrosivity.

The cloud server 112 can generate output relating to corrosion initiation, corrosion propagation, or other corrosion phenomena for display on a display device, such as the mobile device 114 and/or the personal computer 116. The output can include potential difference measurements in their raw form or converted into corrosion-related properties. The output can include graphs, tables, spreadsheets, and maps.

The cloud server 112 can generate warnings when the potential difference measurements that exceed or fall below a predetermined threshold. For example, in this exemplary embodiment, the metallic component 200 can be a cinch made from carbon steel with a surface layer that includes zinc, aluminum, and a binder.

The typical potential difference measurement will be about 40 millivolts. In such embodiments, the cloud server 112 will generate warnings when the potential difference measurements fall within the range of about 200 to 300 millivolts, due to the presence of oxides and other corrosion by-products on the surface of the metallic component 200.

The cloud server 112 can be a component or server of any suitable cloud system, such as AWS (Amazon Web Services) by Amazon.com, Inc. of Seattle, Washington. Other suitable cloud systems include Azure, Google Cloud, local storage, and other equivalent systems. Azure is provided by Microsoft Corporation of Redmond, Washington. Google Cloud is provided by Google LLC of Mountain View, California.

Network 118 can be implemented by any type of network or combination of networks including, without limitation: a wide area network (WAN) such as the Internet, a local area network (LAN), a Peer-to-Peer (P2P) network, a telephone network, a private network, a public network, a packet network, a circuit-switched network, a wired network, and/ or a wireless network. In this exemplary embodiment, the network 118 is a wifi network.

The mobile device 114 and/or the personal computer 116 can be any type of computing device, including a server, a smartphone, a handheld computer, a tablet, a PC, or any other computing device. The cloud server 112, the mobile device 114, and/or the personal computer 116 can communicate via network 118 using various communication protocols (e.g., Internet communication protocols, WAN communication protocols, LAN communications protocols, P2P protocols, telephony protocols, and/or other network communication protocols), various authentication protocols, and/or various data types (web-based data types, audio data types, video data types, image data types, messaging data types, signaling data types, and/or other data types).

The system 100 via the server 112, the mobile device 114 and/or the personal computer 116 is password protected. The system 100 can utilize SSL certificates with the highest level of encryption to provide sufficient security to store sensitive technical information, confidential business information, and other similar information.

The system 100 can be configured with enhanced security to receive and to store financial information and/or to process financial transactions. The system 100 can be configured to accept payments, including credit card payments or other similar payment methods. The system 100 can be made available on a subscription basis.

As shown in FIG. 1, the cloud server 112 can include an Artificial Intelligence (AI) module 134 that can identify critical potential difference measurements and/or corrosion properties that correspond to corrosion phenomena and/or corrosion forms for the outdoor structure 210. The module 134 can set thresholds for generating alarms or perform other tasks to achieve other objectives.

The AI module 134 can have a trained AI model. The AI module 134 can utilize an AI application and/or a machine learning application. The AI module 134 can emulate human thought and perform tasks in a real-world environment, namely identifying patterns, making decisions, and improving operations through experience and data. The AI module 136 can use deep learning, neural networks, computer vision, and natural language processing.

Figure 3:
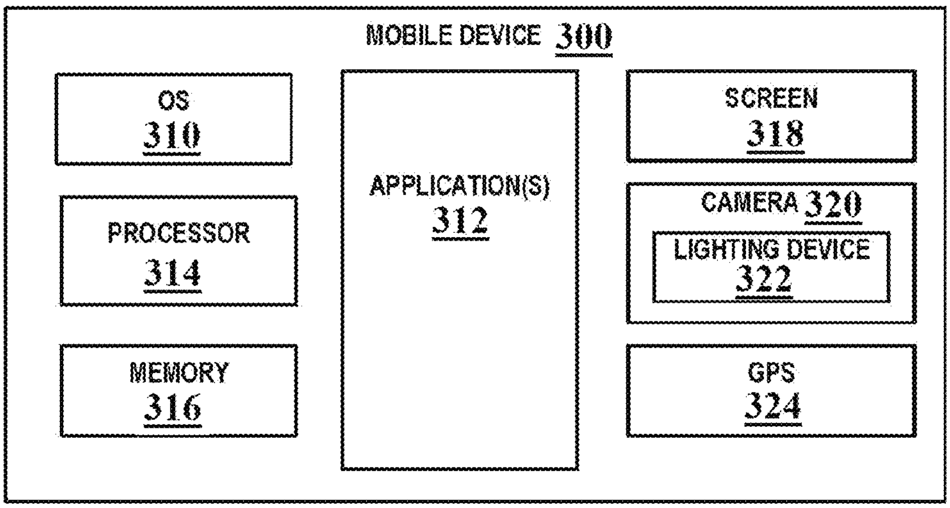
FIG. 3 is a block diagram of an exemplary mobile device in accordance with the subject disclosure.

Referring now to FIG. 3 with continuing reference to the foregoing figures, an exemplary mobile device, generally designated by the numeral 300, is shown. The mobile device 300 can be the mobile device 114 shown in FIG. 1.

Mobile device 300 can include operating system 310 and various types of mobile application(s) 312. In some implementations, mobile application(s) 312 can include one or more client application(s) and/or components of a client application. In this exemplary embodiment, one of the mobile applications 312 can be an app that can provide an interface that displays output relating to potential difference measurements, corrosion phenomena, corrosion forms, and/or critical corrosion properties.

The app can be configured to display warnings when the potential difference measurements exceed or fall below a predetermined threshold correlated to at least one of a corrosion phenomenon, a corrosion form, and a critical corrosion property. Additionally, the app can display graphs, tables, spreadsheets, and maps on the interface.

Mobile device 300 can include processor 314 for performing tasks such as signal coding, data processing, input/output processing, power control, and/or other functions, and memory 316 that can be used for storing data and/or code for running operating system 310 and/or mobile application(s) 312. Example data can include web pages, text, images, sound files, video data, or other data to be sent to and/or received from one or more network servers or other devices via one or more wired and/or wireless networks, such as the cloud server 112 and the network 118 shown in FIG. 1.

Mobile device 300 can include screen 318 and camera 320. The camera 320 can include a lighting device 322. Operating system 310, application(s) 312, processor 314, and/or memory 316 can cooperate to utilize the camera 320 and the lighting device 322 to obtain images. The screen 318 can display rendered output from mobile application(s) 312 that can include text, images, graphs, charts, spreadsheets, tables, maps, and other similar output.

The mobile device 300 can configure and implement a global positioning system (GPS) 324. The operating system 310 and/or the application(s) 312 can communicate with the GPS 324 to obtain location data. The GPS 324 can be used by the app 312 to help a user identify a nearby structure, such as the outdoor structure 210 shown in FIGS. 1-2.

Referring now to FIGS. 4-9 with continuing reference to the foregoing figures, exemplary output for an application is shown. The output is depicted through a series of interfaces 400-410 that can be displayed on a display device. In this exemplary embodiment, the interfaces 400-410 can be displayed on the mobile device 114 shown in FIG. 1 and/or the mobile device 300 shown in FIG. 3.

Figure 4:
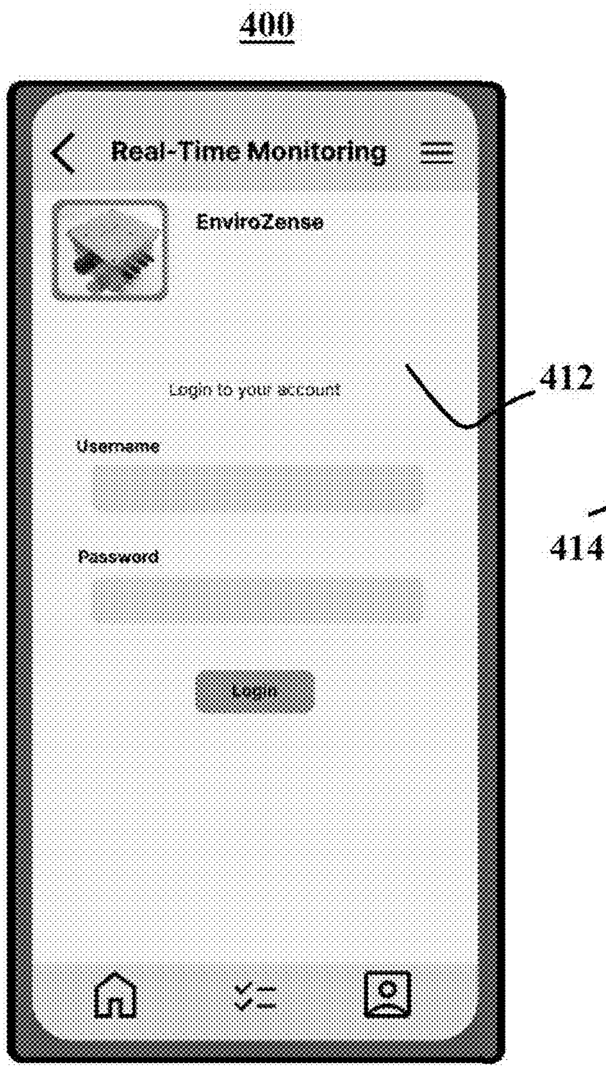
FIG. 4 illustrates screen output for an exemplary user interface in accordance with the described subject matter.
Figure 5:
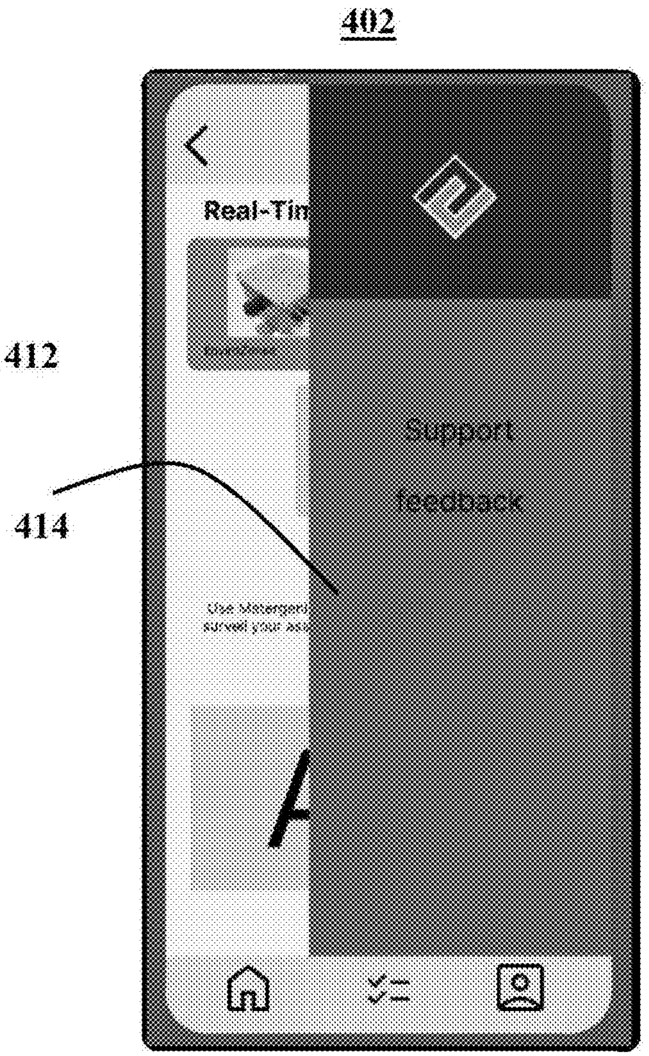
FIG. 5 illustrates screen output for an exemplary user interface in accordance with the described subject matter.

The interface 400 shown in FIG. 4 includes a login screen 412. The login screen 412 is password protected, so that users can enter in their login name and passwords to access an app, such as one of the mobile applications 312 shown in FIG. 3. The interface 402 shown in FIG. 5 includes a menu 414 for navigating parts of the app.

Figure 6:
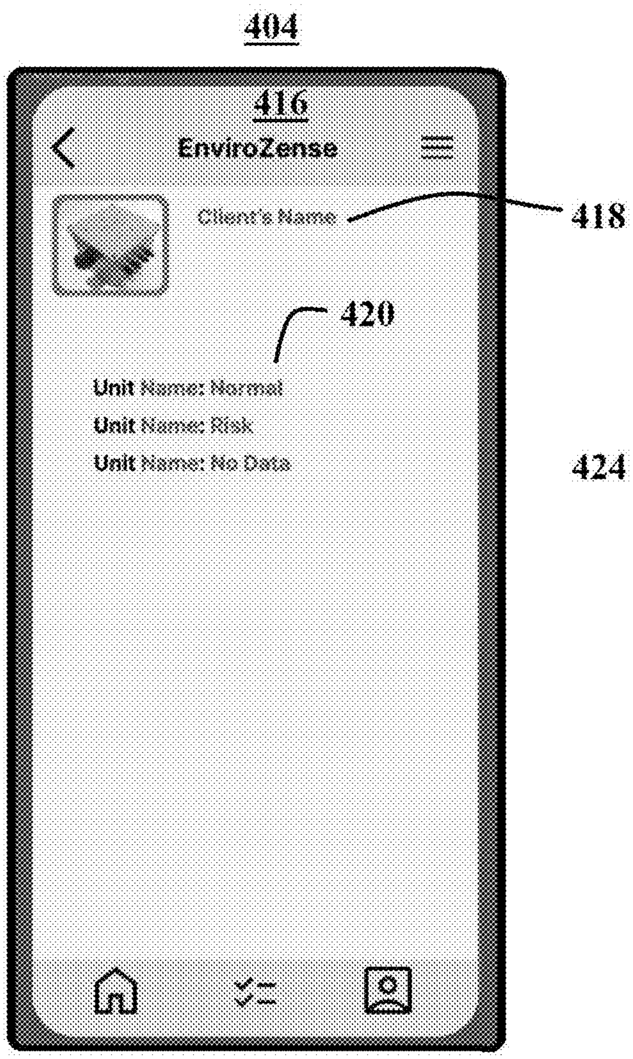
FIG. 6 illustrates screen output for an exemplary user interface in accordance with the described subject matter.
Figure 7:
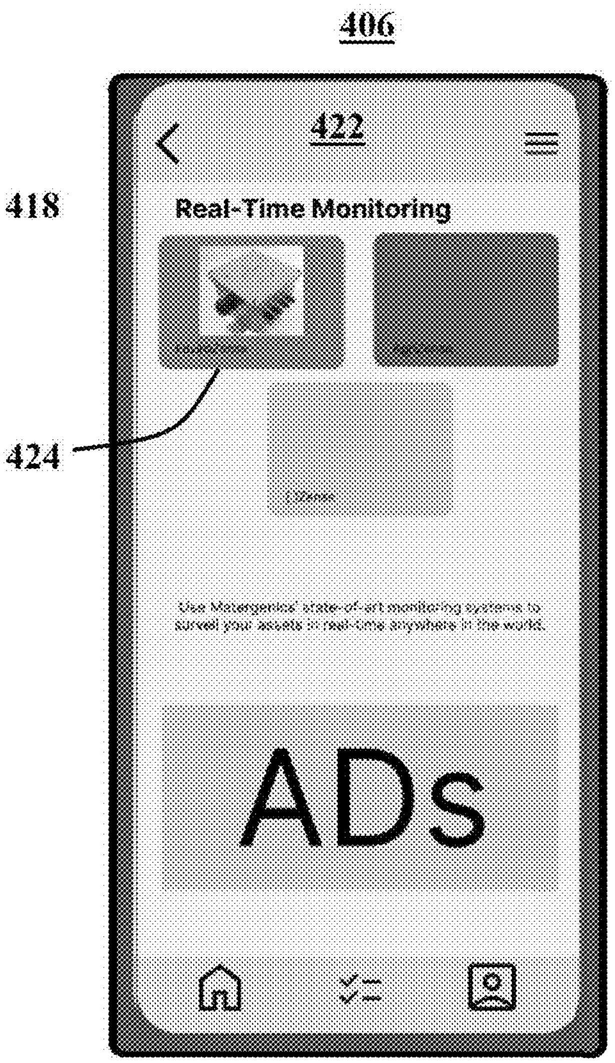
FIG. 7 illustrates screen output for an exemplary user interface in accordance with the described subject matter.

The interface 404 shown in FIG. 6 includes a data page 416 for listing data about a client/user 418 and the individual units 420 that can be used to monitor structures, such as the outdoor structure 210 shown in FIGS. 1-2. The interface 406 shown in FIG. 7 includes a home page 422 that includes a button 424 for activating a monitoring system, such as system 100 shown in FIGS. 1-2.

Figure 8:
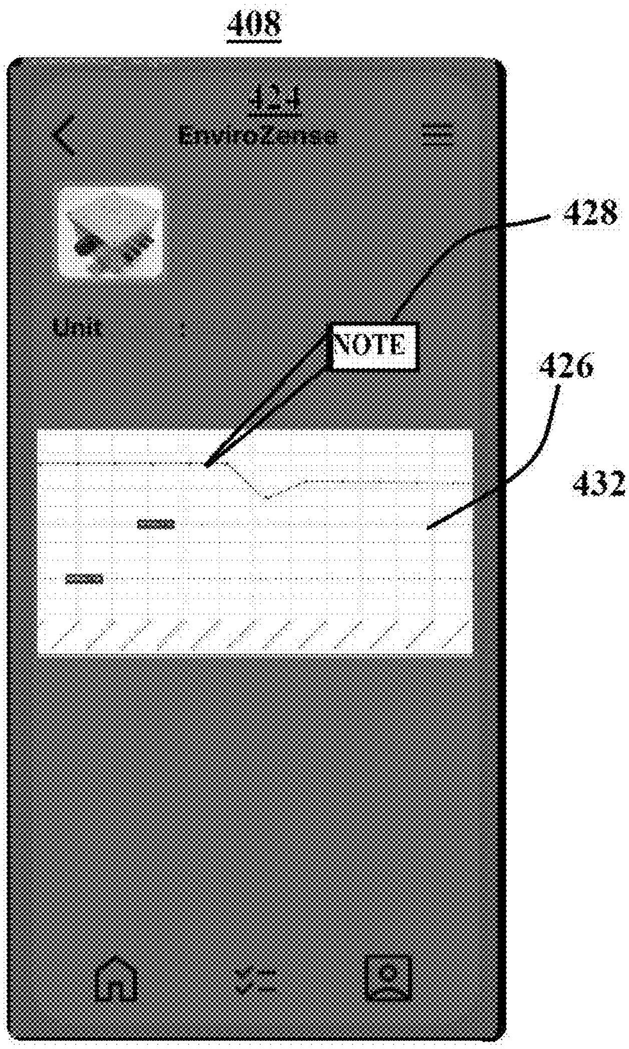
FIG. 8 illustrates screen output for an exemplary user interface in accordance with the described subject matter.
Figure 9:
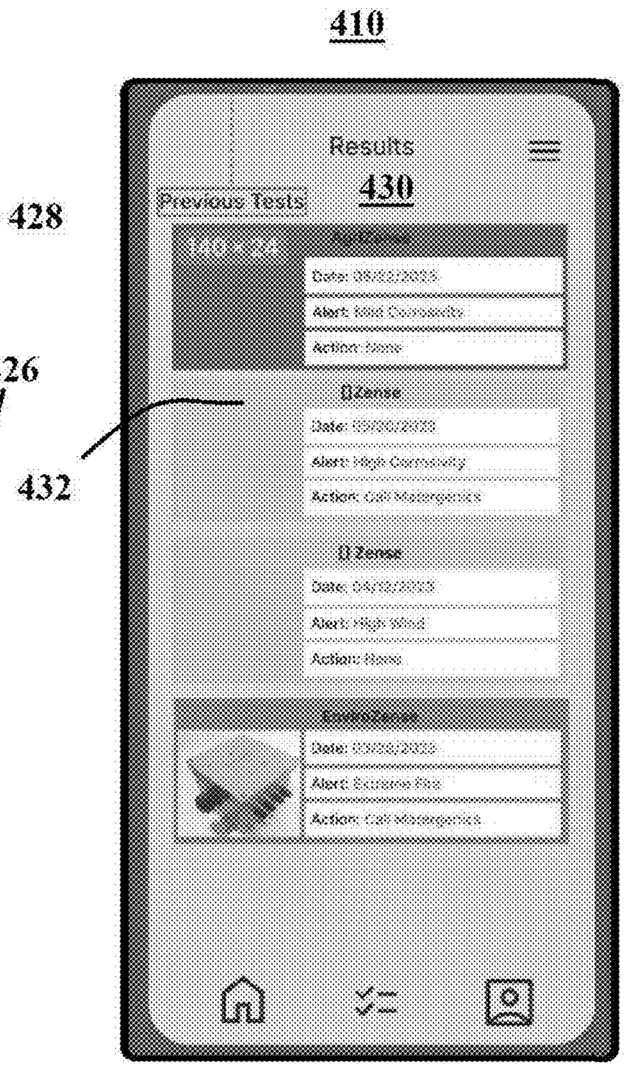
FIG. 9 illustrates screen output for an exemplary user interface in accordance with the described subject matter.

The interface 408 shown in FIG. 8 includes a unit page 424. The unit page 424 can include a graph 426 showing potential difference measurements or corrosion property measurements as a function of time. The graph 426 can be annotated with notes 428 to mark the graph 426 when a particular corrosion-related event occurs at a particular time. The interface 410 shown in FIG. 9 includes a results page 430 for showing test results or measurements 432 for a particular testing unit.

Figure 10:
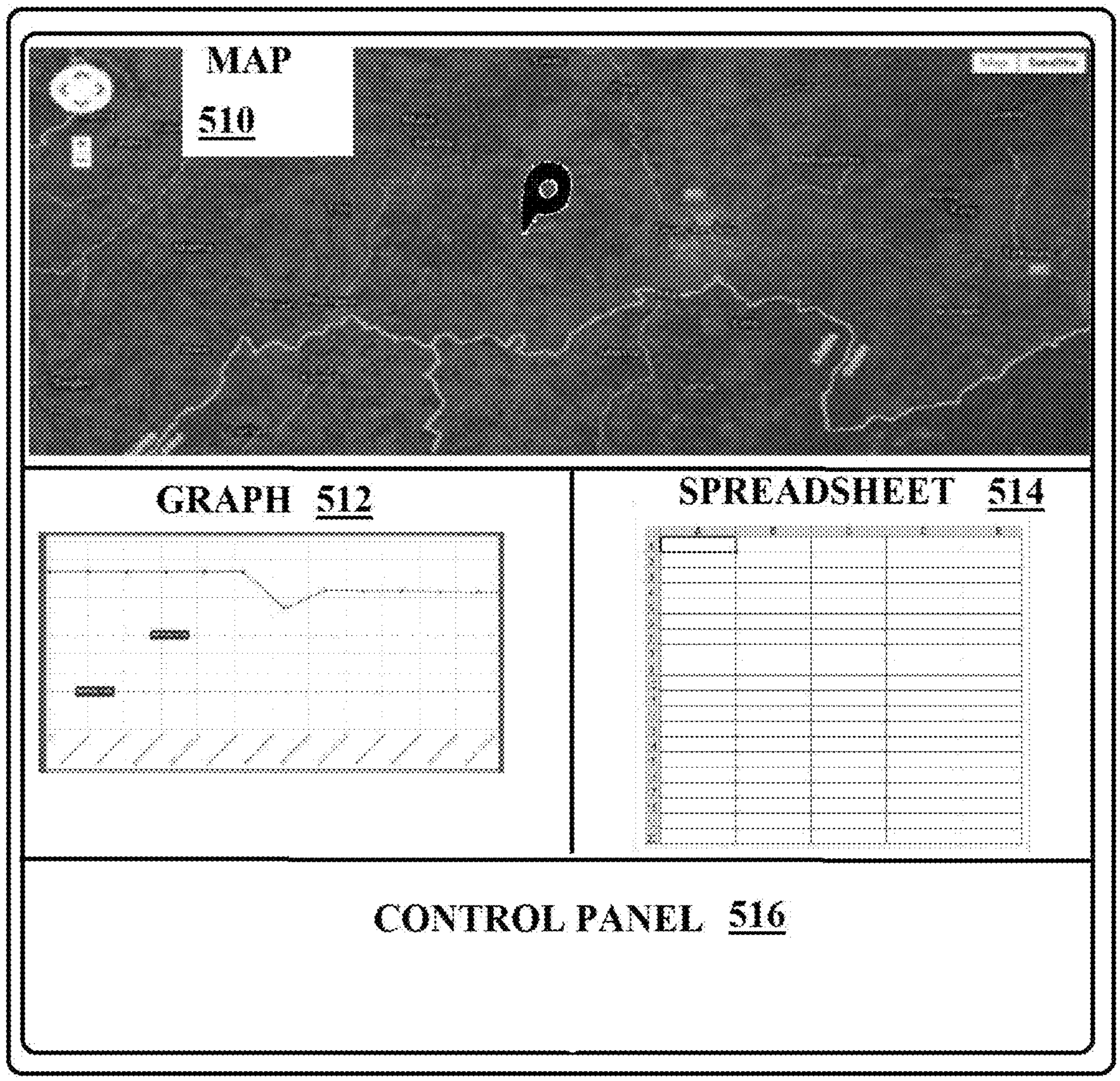
FIG. 10 illustrates screen output for an exemplary user interface in accordance with the described subject matter.

Referring now to FIG. 10 with continuing reference to the foregoing figures, exemplary output depicting an administrative page, generally designated by numeral 500, is shown. The output is depicted as an interface on a computing device, such as on the personal computer 116 shown in FIG. 1. The output can include maps 510, graphs 512, tables or spreadsheets 514 or other similar output.

The administrative page 500 can include a control panel 516 through which a system, such as the system 100, shown in FIG. 1 can receive input relating to critical corrosion properties. The properties can be derived through offline experiments or through artificial intelligence.

Exemplary Processes

Figure 11:
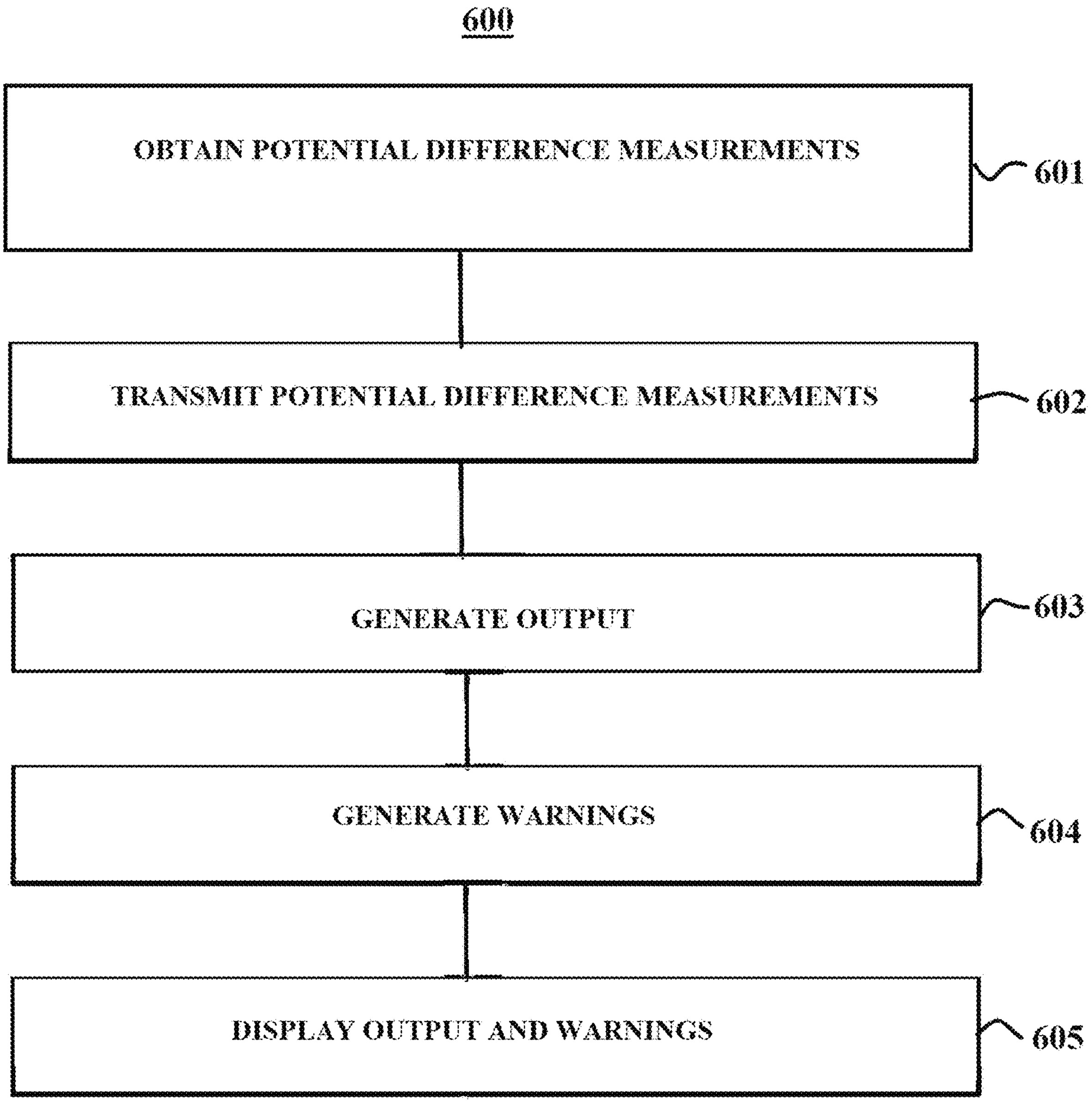
FIG. 11 illustrates an exemplary process in accordance with this disclosure.

Referring to FIG. 11 with continuing reference to the foregoing figures, an exemplary process, generally designated by the numeral 600, for monitoring corrosion of a metal component is provided. In this exemplary embodiment, the metal component can be the metallic component 210 shown in FIGS. 1-2 that abuts the pair of spaced apart probes 120-122.

At 601, the potential difference between the probes is measured to obtain potential difference measurements. In this exemplary embodiments, the potential difference measurements are obtained by a voltage measurement device, such as the voltage measuring device 128 shown in FIG. 1.

At 602, the potential difference measurements are transmitted over a network to a computing device. In this exemplary embodiment, the network can be the network 118 shown in FIG. 1, and the computing device can be the cloud server 112 shown in FIG. 1

At 603, output for displaying the potential difference measurements is generated. In this exemplary embodiment, the output can be generated by computing devices, such as the cloud server 112 shown in FIG. 1.

At 604, warnings are generated for display when the potential difference measurements exceed or are lower than a predetermined threshold correlated to at least one of the onset of a corrosion phenomenon, the presence of a corrosion form, or a critical corrosion property value.

At 605, the output and the warnings are displayed on a display device. In this exemplary embodiment, the display device can be the mobile device 114 and/or the personal computer 116 shown in FIG. 1.

Exemplary Cloud Architecture

Figure 12:
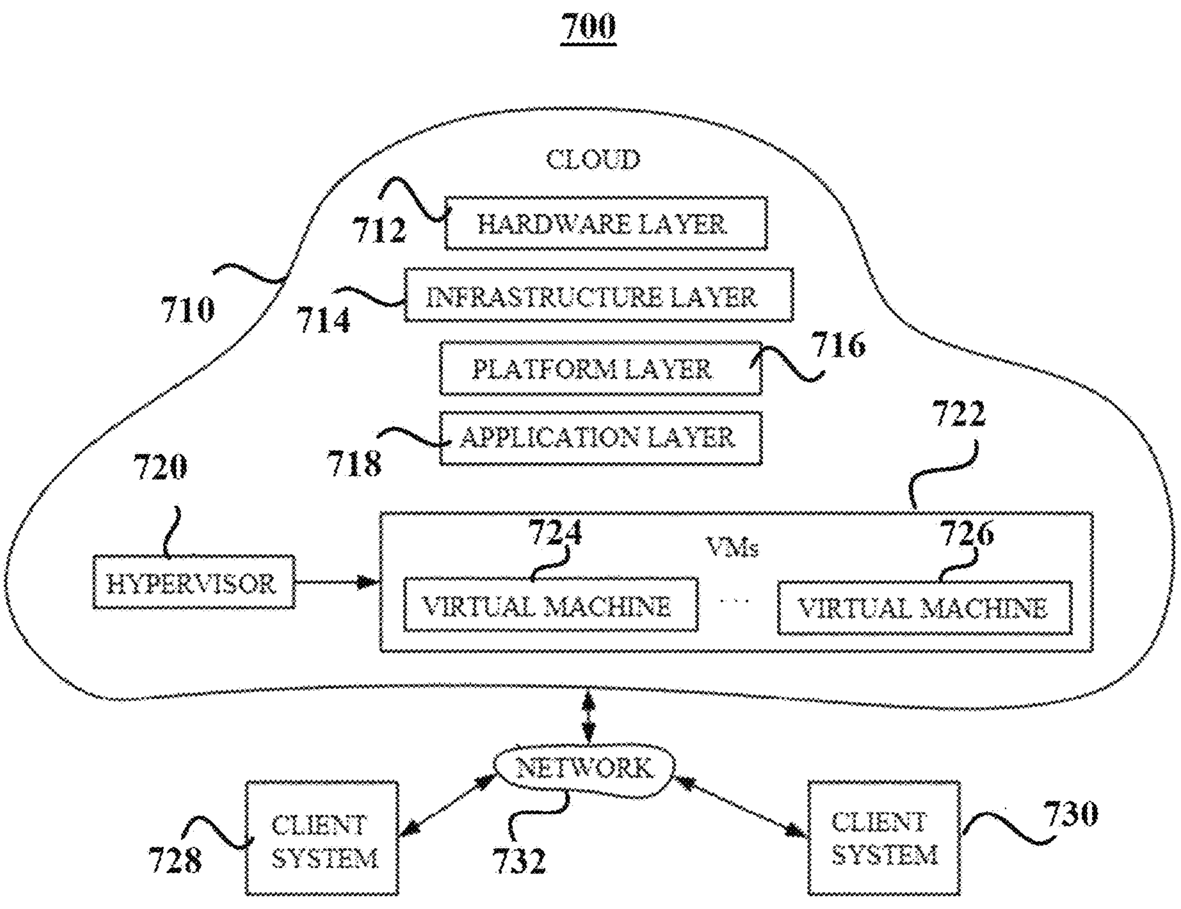
FIG. 12 illustrates a block diagram of a cloud-based computing system operable to execute the disclosed systems and methods in accordance with this disclosure.

Referring to FIG. 12 with continuing reference to the foregoing figures, exemplary cloud architecture, generally designated by the numeral 700, for implementing the system 100 shown in FIG. 1 is shown. Cloud computing provides computation, software, data access, and storage services that do not require end-user knowledge of the physical location or configuration of the system that delivers the services. In various embodiments, cloud computing delivers the services over a wide area network, such as the internet, using appropriate protocols. For instance, cloud computing providers deliver applications over a wide area network and they can be accessed through a web browser or any other computing component.

Software or components of architecture 700 as well as the corresponding data, can be stored on servers at a remote location. The computing resources in a cloud computing environment can be consolidated at a remote data center location or they can be dispersed. Cloud computing infrastructures can deliver services through shared data centers, even though they appear as a single point of access for the user. Thus, the components and functions described herein can be provided from a service provider at a remote location using a cloud computing architecture. Alternatively, they can be provided from a conventional server, or they can be installed on client devices directly, or in other ways.

The description is intended to include both public cloud computing and private cloud computing. Cloud computing (both public and private) provides substantially seamless pooling of resources, as well as a reduced need to manage and configure underlying hardware infrastructure.

A public cloud is managed by a vendor and typically supports multiple consumers using the same infrastructure. Also, a public cloud, as opposed to a private cloud, can free up the end users from managing the hardware. A private cloud can be managed by the organization itself and the infrastructure is typically not shared with other organizations. The organization still maintains the hardware to some extent, such as installations and repairs, etc.

As shown in FIG. 12, the cloud architecture 700 includes a cloud 710. The cloud 710 (or each of the different premises on the cloud 710) can include a hardware layer 712, an infrastructure layer 714, a platform layer 716, and an application layer 718.

A hypervisor 720 can illustratively manage or supervise a set of virtual machines 722 that can include a plurality of different, independent, virtual machines 724-726. Each virtual machine can illustratively be an isolated software container that has an operating system and an application inside it. It is illustratively decoupled from its host server by hypervisor 720. In addition, hypervisor 720 can spin up additional virtual machines or close virtual machines, based upon workload or other processing criteria.

A plurality of different client systems 728-730 (which can be end user systems or administrator systems, or both) can illustratively access cloud 710 over a network 732. Depending upon the type of service being used by each of the client systems 728-730, cloud 710 can provide different levels of service. In one example, the users of the different client systems are provided access to application software and databases. The cloud service then manages the infrastructure and platforms that run the application. This can be referred to as software as a service (or SaaS). The software providers operate application software in application layer 712 and end users access the software through the different client systems 728-730.

The cloud provider can also use platform layer 716 to provide a platform as a service (PaaS). This involves an operating system, programming language execution environment, database and webserver being provided to the client systems 728-730, as a service, from the cloud provider. Application developers then normally develop and run software applications on that cloud platform and the cloud provider manages the underlying hardware and infrastructure and software layers.

The cloud provider can also use infrastructure layer 714 to provide infrastructure as a service (IaaS). In such a service, physical or virtual machines and other resources are provided by the cloud provider, as a service. These resources are provided, on-demand, by the IaaS cloud provider, from large pools installed in data centers. In order to deploy applications, the cloud users that use IaaS install operating-system images and application software on the cloud infrastructure 700.

It should also be noted that architecture 700, or portions of it, can be disposed on a wide variety of different devices. Some of those devices include servers, desktop computers, laptop computers, tablet computers, or other mobile devices, such as palm top computers, cell phones, smart phones, multimedia players, personal digital assistants, etc.

Exemplary Computer System

Figure 13:
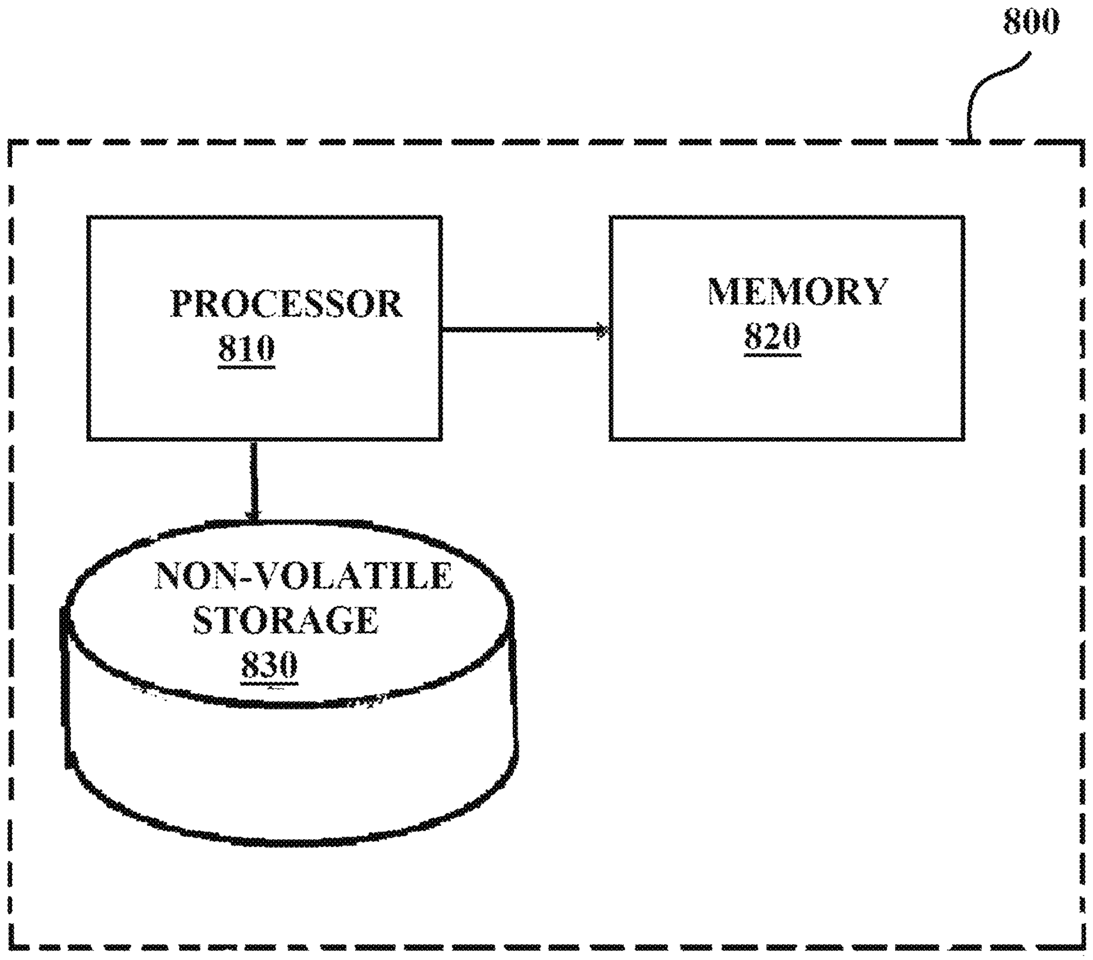
FIG. 13 illustrates a schematic diagram of a computing system operable to execute the disclosed systems and methods in accordance with this disclosure.

Referring now to FIG. 13 with continuing reference to the forgoing figures, an illustrative implementation of a computing device or computer system 800 that can be used in connection with any of the embodiments of the disclosure provided herein is shown. The computer system 800 can include one or more processors 810 and one or more articles of manufacture that comprise non-transitory computer-readable storage media (e.g., memory 820 and one or more non-volatile storage media 830). The processor 810 can control writing data to and reading data from the memory 820 and the non-volatile storage device 830 in any suitable manner. To perform any of the functionality described herein, the processor 810 can execute one or more processor-executable instructions stored in one or more non-transitory computer-readable storage media (e.g., the memory 820), which can serve as non-transitory computer-readable storage media storing processor-executable instructions for execution by the processor 810.

The terms "program" or "software" are used herein in a generic sense to refer to any type of computer code or set of processor-executable instructions that can be employed to program a computer or other processor to implement various aspects of embodiments as discussed above.

References to a "module", "a software module", and the like, indicate a software component or part of a program, an application, and/or an app that contains one or more routines. One or more independently modules can comprise a program, an application, and/or an app.

References to an "app", an "application", and a "software application" shall refer to a computer program or group of programs designed for end users. The terms shall encompass standalone applications, thin client applications, thick client applications, web-based applications, such as a browser, and other similar applications.

Additionally, it should be appreciated that according to one aspect, one or more computer programs that when executed perform methods of the disclosure provided herein need not reside on a single computer or processor, but can be distributed in a modular fashion among different computers or processors to implement various aspects of the disclosure provided herein. Processor-executable instructions can be in many forms, such as program modules, executed by one or more computers or other devices. Generally, program modules include routines, programs, objects, components, data structures, etc., that perform particular tasks or implement particular abstract data types. Typically, the functionality of the program modules can be combined or distributed as desired in various embodiments.

Also, data structures can be stored in one or more non-transitory computer-readable storage media in any suitable form. For simplicity of illustration, data structures can be shown to have fields that are related through location in the data structure. Such relationships can likewise be achieved by assigning storage for the fields with locations in a non-transitory computer-readable medium that convey relationship between the fields. However, any suitable mechanism can be used to establish relationships among information in fields of a data structure, including through the use of pointers, tags or other mechanisms that establish relationships among data elements.

Supported Features and Embodiments

The detailed description provided above in connection with the appended drawings explicitly describes and supports various features of systems and methods for monitoring and for measuring atmospheric corrosivity and corrosion. By way of illustration and not limitation, supported embodiments include a system for monitoring corrosion of a metal component comprising: a pair of spaced apart probes abutting the metal component; a housing having a voltage measuring device coupled to the probes to measure the potential difference therebetween and a transmitter for transmitting potential difference measurements from the voltage measuring device over a network; a computing device connected to the network having an interface, a processor, and memory programmed with executable instructions to: receive the potential difference measurements through the network; and generate output for displaying the potential difference measurements with warnings on the interface when the potential difference measurements exceed or fall below a predetermined threshold correlated to at least one of a corrosion phenomenon, a corrosion form, and a critical corrosion property.

Supported embodiments include the foregoing system, further comprising: a display device for displaying the output on the interface.

Supported embodiments include any of the foregoing systems, wherein the voltage measuring device is a device selected from the group consisting of a voltmeter and a multimeter.

Supported embodiments include any of the foregoing systems, wherein the network is a wifi network.

Supported embodiments include any of the foregoing systems, wherein the computing device receives the potential difference measurements at regular intervals.

Supported embodiments include any of the foregoing systems, wherein the computing device receives the potential difference measurements every two hours.

Supported embodiments include any of the foregoing systems, wherein the metal component is a fastener.

Supported embodiments include any of the foregoing systems, wherein the metal component is a cinch for holding solar panels within a solar energy collection system.

Supported embodiments include any of the foregoing systems, wherein the interface is provided by an app on a mobile device.

Supported embodiments include any of the foregoing systems, wherein the corrosion form is selected from the group consisting of surface corrosion, corrosion beneath a surface, and structural corrosion.

Supported embodiments include any of the foregoing systems, wherein the corrosion phenomenon is selected from the group consisting of corrosion initiation and corrosion propagation.

Supported embodiments include any of the foregoing systems, wherein the output includes at least one of a graph, a table, a spreadsheet, and a map.

Supported embodiments include a method for monitoring corrosion of a metal component with a pair of spaced apart probes abutting the metal component, the method comprising: measuring the potential difference between the pair of spaced apart probes to obtain potential difference measurements; transmitting the potential difference measurements over a network to a computing device; generating output for displaying the potential difference measurements; and generating warnings for display when the potential difference measurements exceed or are lower than a predetermined threshold correlated to at least one of the onset of a corrosion phenomenon, the presence of a corrosion form, or a critical corrosion property value.

Supported embodiments include the foregoing method, in which the measuring step is performed with a voltage measuring device selected from the group consisting of a voltmeter and a multimeter.

Supported embodiments include any of the foregoing methods, in which the transmitting step is performed over a wifi network.

Supported embodiments include any of the foregoing methods, in which the transmitting step is performed at regular intervals.

Supported embodiments include any of the foregoing methods, in which the regular intervals are every two hours.

Supported embodiments include any of the foregoing methods, further comprising: displaying the output and the warnings on an interface.

Supported embodiments include any of the foregoing methods, further comprising: displaying the output and the warnings on an interface rendered by an app on a mobile device.

Supported embodiments include any of the foregoing methods, wherein the output includes at least one of a graph, a table, a spreadsheet, and a map.

Supported embodiments include any of the foregoing methods, wherein the corrosion form is selected from the group consisting of surface corrosion, corrosion beneath a surface, and structural corrosion.

Supported embodiments include any of the foregoing methods, wherein the corrosion phenomenon is selected from the group consisting of corrosion initiation and corrosion propagation.

Supported embodiments include a kit, an apparatus, and/or means for implementing any of the foregoing systems, methods, or portions thereof.

The detailed description provided above in connection with the appended drawings is intended as a description of examples and is not intended to represent the only forms in which the present examples can be constructed or utilized.

It is to be understood that the configurations and/or approaches described herein are exemplary in nature, and that the described embodiments, implementations and/or examples are not to be considered in a limiting sense, because numerous variations are possible.

The specific processes or methods described herein can represent one or more of any number of processing strategies. As such, various operations illustrated and/or described can be performed in the sequence illustrated and/or described, in other sequences, in parallel, or omitted. Likewise, the order of the above-described processes can be changed.

Although the subject matter has been described in language specific to structural features and/or methodological acts, it is to be understood that the subject matter defined in the appended claims is not necessarily limited to the specific features or acts described above. Rather, the specific features and acts described above are presented as example forms of implementing the claims.

What is claimed is:

1. A system for monitoring corrosion of a metal component comprising:
- a pair of spaced apart probes abutting the metal component;
- a housing having a voltage measuring device coupled to the probes to measure the potential difference therebetween and a transmitter for transmitting potential difference measurements from the voltage measuring device over a network;
- a computing device connected to the network having an interface, a processor, and memory programmed with executable instructions to:
  - receive the potential difference measurements through the network;
  - correlate the potential difference measurements to at least one of a corrosion phenomenon, a corrosion form, or a corrosion property of the metal component; and
  - generate output for displaying the potential difference measurements with warnings on the interface when the potential difference measurements exceed or fall below a predetermined threshold associated with the corrosion phenomenon, the corrosion form, or the corrosion property.

2. The system of claim 1, further comprising:
- a display device for displaying the output on the interface.

3. The system of claim 1, wherein the voltage measuring device is a device selected from the group consisting of a voltmeter and a multimeter.

4. The system of claim 1, wherein the network is a wifi network.

5. The system of claim 1, wherein the computing device receives the potential difference measurements at regular intervals.

6. The system of claim 5, wherein the computing device receives the potential difference measurements every two hours.

7. The system of claim 1, wherein the metal component is a fastener.

8. The system of claim 7, wherein the metal component is a cinch for holding solar panels within a solar energy collection system.

9. The system of claim 1, wherein the interface is provided by an app on a mobile device.

10. The system of claim 1, wherein the corrosion form is selected from the group consisting of surface corrosion, corrosion beneath a surface, and structural corrosion.

11. The system of claim 1, wherein the corrosion phenomenon is selected from the group consisting of corrosion initiation and corrosion propagation.

12. The system of claim 1, wherein the output includes at least one of a graph, a table, a spreadsheet, and a map.

13. A method for monitoring corrosion of a metal component with a pair of spaced apart probes abutting the metal component, the method comprising:
- measuring the potential difference between the pair of spaced apart probes to obtain potential difference measurements;
- transmitting the potential difference measurements over a network to a computing device;
- correlating the potential difference measurements to at least one of a corrosion phenomenon, a corrosion form, or a corrosion property of the metal component;
- generating output for displaying the potential difference measurements; and
- generating warnings for display when the potential difference measurements exceed or are lower than a predetermined threshold associated with the corrosion phenomenon, the corrosion form, or the corrosion property.

14. The method of claim 13, in which the measuring step is performed with a voltage measuring device selected from the group consisting of a voltmeter and a multimeter; and in which the transmitting step is performed over a wifi network.

15. The method of claim 13, in which the transmitting step is performed at regular intervals.

16. The method of claim 15, in which the regular intervals are every two hours.

17. The method of claim 13, further comprising:
- displaying the output and the warnings on an interface.

18. The method of claim 13, further comprising:
- displaying the output and the warnings on an interface rendered by an app on a mobile device with the output including at least one of a graph, a table, a spreadsheet, and a map.

19. The method of claim 13, wherein the corrosion form is selected from the group consisting of surface corrosion, corrosion beneath a surface, and structural corrosion.

20. The method of claim 13, wherein the corrosion phenomenon is selected from the group consisting of corrosion initiation and corrosion propagation.

* * * * *